April 20, 1954  J. C. HEINTZ  2,675,855
RETREADING OF TIRES
Filed Dec. 6, 1950  2 Sheets-Sheet 1

INVENTOR.
JAMES C. HEINTZ
BY
ATTORNEY

April 20, 1954     J. C. HEINTZ     2,675,855
RETREADING OF TIRES

Filed Dec. 6, 1950     2 Sheets-Sheet 2

INVENTOR.
BY JAMES C. HEINTZ
ATTORNEY

Patented Apr. 20, 1954

2,675,855

UNITED STATES PATENT OFFICE 2,675,855

RETREADING OF TIRES

James C. Heintz, Lakewood, Ohio; The Cleveland Trust Company, executor of the said James C. Heintz, deceased Application December 6, 1950, Serial No. 199,448

2 Claims. (Cl. 154—14)

This invention relates to the retreading of tires, and more particularly that type of retreading in which the shoulder as well as the tread of the tire is replaced with new rubber.

In certain types of tires, and particularly tires such as off-the-road tires, etc., where frictional engagement is desired between the shoulder of the tire and mud or slush or the like in which the tire is to be used, it is customary to replace the shoulder as well as the tread of a tire with new rubber when the tread or shoulder surface has become badly worn or damaged. In retreading, it is desirable to replace the shoulder, regardless of the type of the tire because of the improved appearance of the retread job. The camelback used for this purpose is wider than that employed when only the worn tread is replaced. The edges of the camelback extend out over the shoulders of the tire, and before the tire is placed in the retreading mold the edge portions of the camelback which overhang the buffed shoulders are pressed down over the buffed shoulder surfaces to facilitate inserting the tire in the mold and to insure uniform flow of the new rubber over the entire buffed surface when the tire is placed under pressure in the mold. Bringing the edges of the camelback down over the buffed shoulders is a time-consuming job and it requires considerable skill to do it satisfactorily.

According to this invention narrower camelback is used which does not extend any considerable distance beyond the tread surface. It is not so wide that it is necessary to mechanically press it over the buffed shoulder surface before placing it in the mold. Separate strips of rubber, which preferably are thinner than the thinnest portion of the camelback, are then placed over the cemented surfaces at the shoulders. This is quickly and readily done. The tire is then inserted in the retreading mold and the total rubber in the camelback and in the narrow side strips is sufficient to completely fill the molding cavity between the tire carcass and the mold matrices.

The mold matrices used for such an operation may be different from those used in the past for providing both a new tread and new shoulders on a used tire. Preferably they are designed to save rubber by providing for only a small amount of new rubber at the shoulders. If there is a flow stripe in the mold matrix, just below the shoulder, it is advantageous to design the matrix to allow for only a thin covering of new rubber between this and the tread. The matrix surface need not be flat at the shoulders, but may be fluted or bear any desired design. However, instead of providing for a substantial covering of new rubber at the shoulders, for example, one eighth inch or thicker, as has been customary when the rubber from the camelback has been used to supply the new shoulders, the cavity used for the retreading operation herein contemplated will generally provide for no more than one sixteenth inch of new rubber over the buffed shoulder surfaces. Over any grooves or other depressed figures in the shoulder portion of the matrix the new rubber may be no thicker than to allow for a covering of several thousandths of an inch.

It is customary in retreading a tire to buff the old rubber from the surface which is to be renewed, and then coat the buffed surface with a rubber adhesive. The new rubber is cured to this, under pressure. Any such usual treatment of the tire is employed in carrying out the present invention.

The invention will be further described in connection with the accompanying drawings, in which—

Figure 1:
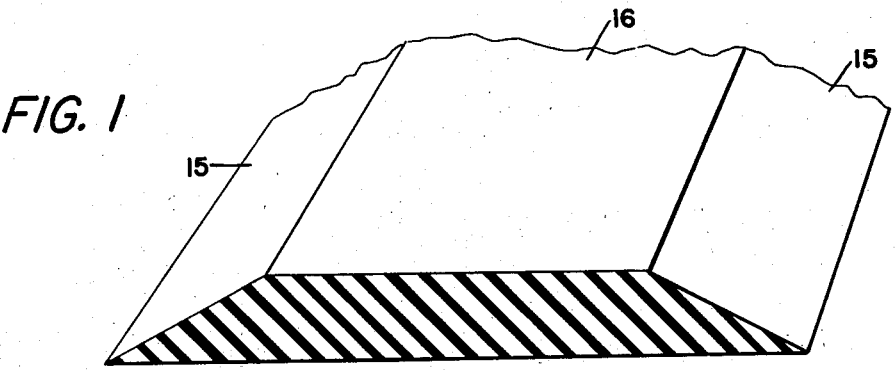
Fig. 1 is a view in perspective of ordinary camelback which may be formed with a hump at the central portion.

Fig. 1 shows wide camelback such as is now being used for retreading and forming new shoulders on a tire. The camelback includes the wing portions 15 at each edge of the hump 16. The camelback for a 8.25 x 20 tire measures 11 inches across the base, and 6 inches across the hump. Each of the wings 15 is 2.5 inches wide. It is customary to employ camelback with a hump, although this is not necessary. The hump insures an adequate supply of new rubber at the portion of the tread which carries the design and assures the operator that all depressions in the matrices at this portion of the tread will be filled with rubber.

Figure 2:
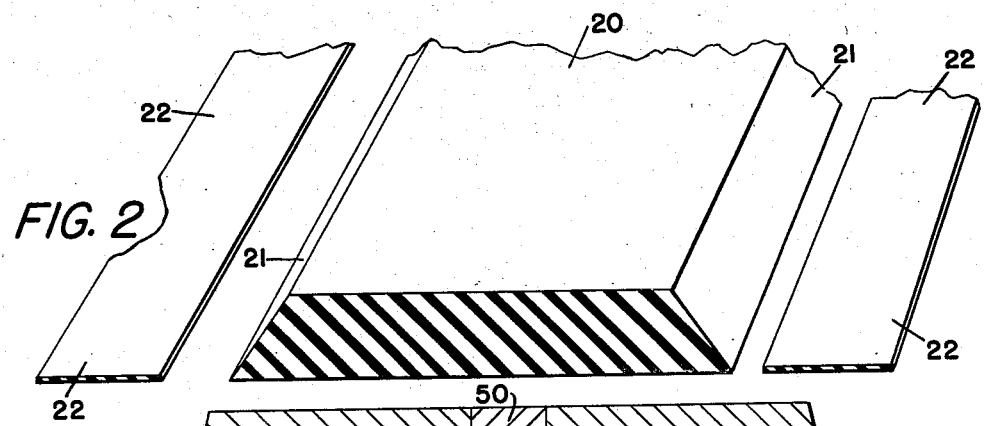
Fig. 2 shows the narrower camelback and shoulder strips which applicant uses in carrying out the invention.

The hump 20 of the camelback shown in Fig. 2 is of the same thickness as the hump shown in Fig. 1, and the top surface area of the camelback is the same in both figures. The base of the camelback to be used on a 8.25 x 20 tire, according to this invention, will preferably be only 7 inches wide. The wings are almost entirely eliminated, leaving only the narrow portions 21. This camelback is designed to cover the tread portion of the tire with little or no extension beyond the shoulder lines. The shoulder strips 22 in combination with the overflow from the narrow wings 21 of the camelback supply all the rubber required to resurface the shoulders. The camelback covers the buffed tread surface in much the same manner that camelback ordinarily covers the buffed surface of a tire in which only the tread (and not the shoulders) is covered with new rubber.

Figure 3:
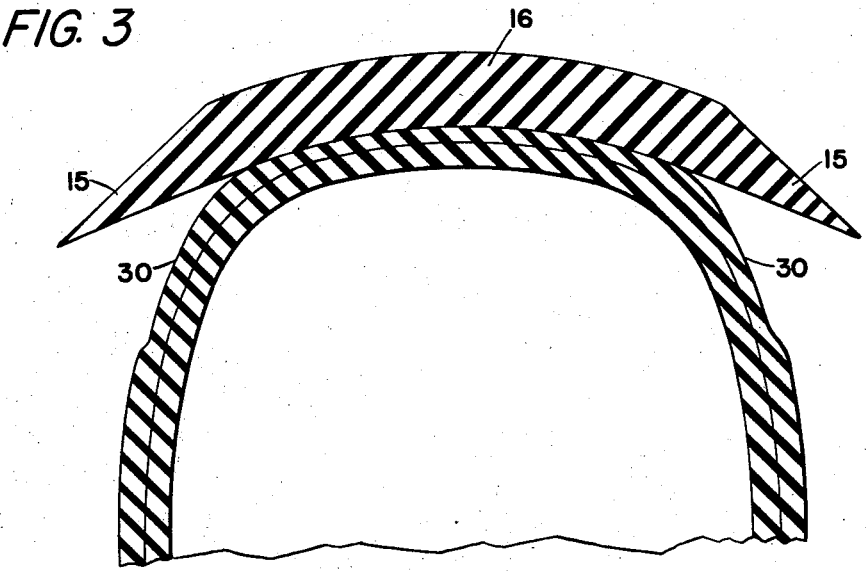
Fig. 3 is a section through a tire with wide camelback applied to its tread, illustrating the present practice.

When the camelback with the wide wings is used to retread a tire the shoulders of which are to be renewed, the wings project beyond the buffed shoulder lines, as illustrated in Fig. 3. It is necessary to work the rubber in these wings 15 of the camelback down over the buffed shoulder surfaces 30 before placing the tire in the mold. This is very hard to do by hand, and is time-consuming and expensive.

Figure 4:
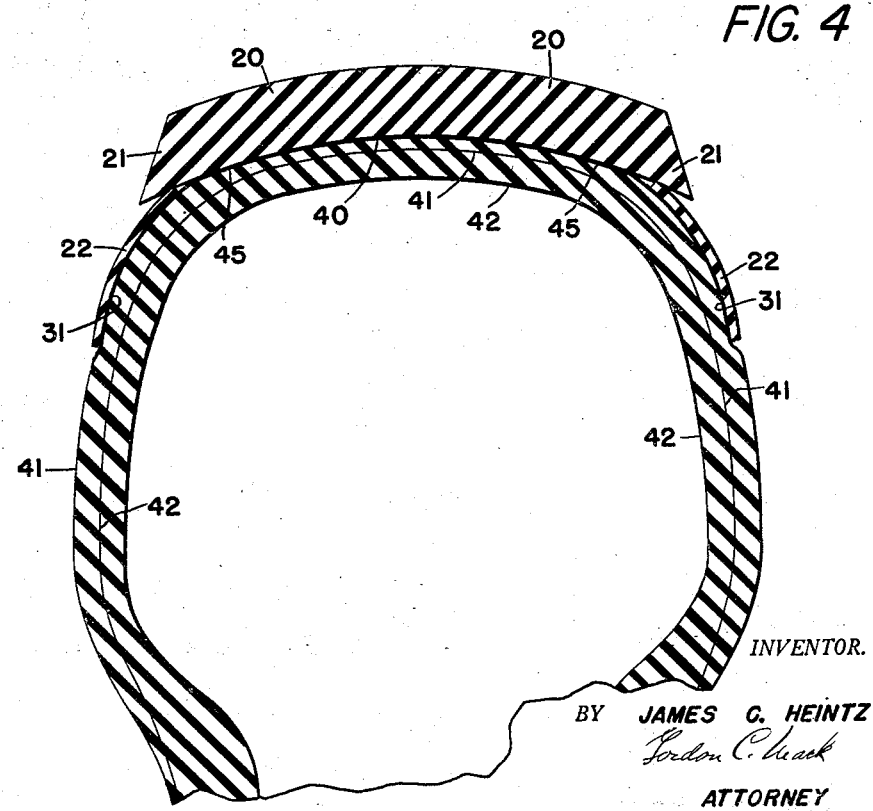
Fig. 4 is a section through a tire with the camelback and thin side strips in place as contemplated by the new and improved practice of this invention which requires the application of only a small amount of new rubber at the shoulders.

It is much simpler to use the applicant's narrower camelback with separate thin shoulder pieces 22 which advantageously are thinner than the wing portions of the camelback. The shoulder strips 22 need be no thicker than required to merely cover the buffed shoulder surface 31 (Fig. 4). If there is a design on the shoulders the new rubber will preferably cover the fluted portions of the design with only a very thin coating. The rubber will be forced out between these thin portions to fill in the depressed portions of the shoulder design.

In retreading a tire according to this invention the tread surface is buffed in any of the usual ways to the line 40 (Fig. 4). The fabric plies lie between the lines 41 and 42. The buffed surfaces 40 and 31 are coated with rubber adhesive 45. The shoulder strips 22 are preferably put on the tire first and pressed against the adhesively coated buffed shoulders. Then the tread and upper edges of the shoulder strips are covered with camelback 20. The ends of the camelback (which are customarily beveled) are brought together, with the camelback encircling the tread of the tire, as is customary in the art. The tire with the new rubber stock attached in this manner is placed in the molding cavity.

Figure 5:
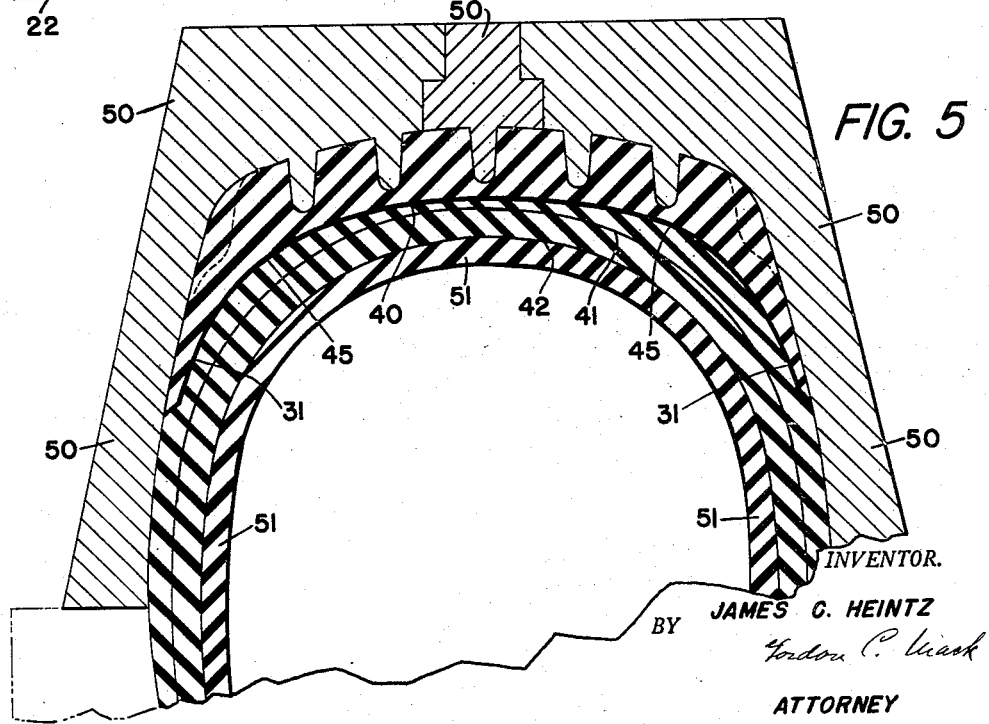
Fig. 5 is a section through the tire with the new rubber pressed between the air bag and matrix surfaces at the start of the curing operation.

Figure 5 is a section through the matrix parts 50 of the mold, and the air bag 51, with the new rubber pressed to the buffed surfaces of the tire, between them. As pressure is applied, the new rubber of the camelback and shoulder strips unite and flow into all portions of the cavity between the mold matrix and the tire carcass. As is customary in the molding of rubber, there is a slight excess of new rubber used in the mold and this is extruded through overflow openings (not shown) of the usual type. Heat is applied in any suitable manner, and the new rubber is cured to the tire carcass.

This process eliminates the difficulty of shaping the camelback down over the buffed shoulder surfaces. It is much easier to apply separate shoulder pieces. By using thin shoulder pieces, e. g. strips of stripping rubber approximately $\frac{1}{16}$ inch thick, much less new rubber is required than has been employed in the prior practices. The shoulder pieces 22 need not be of tread stock but may be more suitably compounded to meet the requirements of rubber used at the shoulders of a tire, and this composition may be chaper than is required for the tire tread. Thus, a material saving in both material and labor results from employing the process of this invention.

What I claim is:

1. In the process of retreading a pneumatic tire and replacing the rubber at the shoulders of the tire by buffing worn rubber from the tread and shoulder surfaces and coating them with a rubber adhesive, the improvement which includes placing on each buffed shoulder surface a separate strip of curable rubber composition and encircling the buffed tread surface with a slab of curable rubber composition, and then while pressing said curable rubber compositions to the adhesively coated buffed surfaces, vulcanizing the curable rubber compositions to themselves and to the adhesive-coated buffed surfaces.

2. The process of claim 1 in which the strips placed on the shoulders are not substantially thicker than one-sixteenth inch.

References Cited in the file of this patent

UNITED STATES PATENTS

| Number | Name | Date |
|---|---|---|
| 1,913,330 | Brickman | June 6, 1933 |
| 2,180,650 | White | Nov. 21, 1939 |
| 2,232,001 | Hawkinson | Feb. 18, 1941 |
| 2,237,819 | Hawkinson | Apr. 8, 1941 |
| 2,382,269 | Stephens et al. | Aug. 14, 1945 |
| 2,421,097 | Lakso | May 27, 1947 |
| 2,421,099 | Vogt | May 27, 1947 |
| 2,501,493 | Beward | Mar. 21, 1950 |

FOREIGN PATENTS

| Number | Country | Date |
|---|---|---|
| 555,976 | Great Britain | Sept. 15, 1943 |